United States Patent
Lutz et al.

(10) Patent No.: US 10,438,322 B2
(45) Date of Patent: Oct. 8, 2019

(54) IMAGE RESOLUTION ENHANCEMENT

(71) Applicant: Microsoft Technology Licensing, LLC, Redmond, WA (US)

(72) Inventors: Moshe R. Lutz, Bellevue, WA (US); Vivek Pradeep, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 111 days.

(21) Appl. No.: 15/607,321

(22) Filed: May 26, 2017

(65) Prior Publication Data

US 2018/0342044 A1    Nov. 29, 2018

(51) Int. Cl.

| | |
|---|---|
| *G06T 3/40* | (2006.01) |
| *H04M 1/02* | (2006.01) |
| *H04N 7/18* | (2006.01) |
| *G06N 3/08* | (2006.01) |
| *G06N 3/04* | (2006.01) |
| *H04N 1/21* | (2006.01) |
| *H04N 5/232* | (2006.01) |

(52) U.S. Cl.
CPC .......... *G06T 3/4046* (2013.01); *G06N 3/04* (2013.01); *G06N 3/08* (2013.01); *H04M 1/0264* (2013.01); *H04N 1/2112* (2013.01); *H04N 7/18* (2013.01); *G06T 2207/10004* (2013.01); *G06T 2207/20084* (2013.01); *G06T 2207/20212* (2013.01); *H04N 5/23203* (2013.01)

(58) Field of Classification Search
CPC ........ G06N 3/049; G06N 3/08; G06N 99/005; B25J 9/163

USPC .... 382/156, 157, 159, 282, 299; 706/15, 16, 706/25, 41; 128/925
See application file for complete search history.

(56) References Cited

U.S. PATENT DOCUMENTS

| | | | | |
|---|---|---|---|---|
| 5,751,910 A | * | 5/1998 | Bryant | G06N 3/0436 706/2 |
| 6,815,683 B2 | * | 11/2004 | Federici | G01N 21/3581 250/330 |
| 7,065,255 B2 | * | 6/2006 | Chen | H04N 1/00137 348/E5.079 |

(Continued)

FOREIGN PATENT DOCUMENTS

WO    2016156864 A1    10/2016

OTHER PUBLICATIONS

"Notice of Allowance Issued in U.S. Appl. No. 15/607,339", dated Sep. 4, 2018, 9 pages.

(Continued)

*Primary Examiner* — Yosef Kassa
(74) *Attorney, Agent, or Firm* — Alleman Hall Creasman & Tuttle LLP

(57) ABSTRACT

Resolution enhancement techniques are described. An apparatus may receive first image data at a first resolution, and second image data at a resolution less than the first resolution. The second image data may be scaled to the first resolution and compared to the first image data. Application of a neural network may scale the first image data to a resolution higher than the first resolution. The application of the neural network may incorporate signals based on the scaled second image data. The signals may include information obtained by comparing the scaled second image data to the resolution of the first image data.

19 Claims, 11 Drawing Sheets

(56) References Cited

U.S. PATENT DOCUMENTS

| | | | |
|---|---|---|---|
| 7,151,801 B2* | 12/2006 | Grossberg | G06T 3/4053 |
| | | | 375/240.27 |
| 7,333,963 B2* | 2/2008 | Widrow | G06K 9/62 |
| | | | 706/18 |
| 7,360,344 B2 | 4/2008 | White et al. | |
| 7,409,372 B2* | 8/2008 | Staelin | G06N 3/08 |
| | | | 706/15 |
| 7,441,610 B2* | 10/2008 | Belnap | C22C 26/00 |
| | | | 175/374 |
| 7,447,382 B2 | 11/2008 | Nestares et al. | |
| 7,860,320 B2 | 12/2010 | Luo et al. | |
| 7,983,486 B2* | 7/2011 | Zhou | G06T 7/46 |
| | | | 358/3.26 |
| 7,991,714 B2 | 8/2011 | Widrow et al. | |
| 8,204,128 B2 | 6/2012 | Huchet et al. | |
| 8,213,737 B2 | 7/2012 | Steinberg et al. | |
| 8,284,996 B2 | 10/2012 | Winkler | |
| 8,340,354 B2 | 12/2012 | Sharma | |
| 8,560,179 B2* | 10/2013 | Basir | B60N 2/002 |
| | | | 382/181 |
| 8,675,105 B2 | 3/2014 | Lansel et al. | |
| 8,699,784 B2* | 4/2014 | Langmatz | G06T 7/001 |
| | | | 382/145 |
| 9,117,262 B2 | 8/2015 | Lin et al. | |
| 9,134,399 B2 | 9/2015 | Brown et al. | |
| 9,142,010 B2 | 9/2015 | Watts et al. | |
| 9,147,128 B1 | 9/2015 | Chafni et al. | |
| 9,232,140 B2 | 1/2016 | Saitwal et al. | |
| 9,357,203 B2 | 5/2016 | Ohba et al. | |
| 9,417,700 B2 | 8/2016 | El Dokor et al. | |
| 9,456,174 B2 | 9/2016 | Boyle et al. | |
| 9,506,903 B2 | 11/2016 | Guthrie et al. | |
| 2006/0002635 A1 | 1/2006 | Nestares et al. | |
| 2012/0098996 A1 | 4/2012 | Vakrat et al. | |
| 2012/0293630 A1 | 11/2012 | Persaud et al. | |
| 2014/0072242 A1 | 3/2014 | Wei et al. | |
| 2014/0074866 A1 | 3/2014 | Shah et al. | |
| 2014/0205140 A1 | 7/2014 | Lovberg et al. | |
| 2014/0347470 A1 | 11/2014 | Zhang et al. | |
| 2014/0368654 A1 | 12/2014 | Wierich | |
| 2015/0009291 A1 | 1/2015 | Cheng et al. | |
| 2015/0030237 A1 | 1/2015 | Jancsary et al. | |
| 2015/0036014 A1 | 2/2015 | Lelescu et al. | |
| 2015/0288877 A1 | 10/2015 | Glazer | |
| 2015/0341547 A1 | 11/2015 | Petrescu et al. | |
| 2016/0370565 A1 | 12/2016 | Bredno et al. | |

OTHER PUBLICATIONS

Glasner, et al., "Super-resolution from a single image", In Proceedings of IEEE 12th International Conference on Computer Vision, Sep. 29, 2009, 8 Pages.

Hidane, et al., "Super-resolution from a low- and partial high-resolution image pair", In Proceedings of IEEE International Conference on Image Processing (ICIP), Oct. 27, 2014, 5 Pages.

Ignatov, et al., "DSLR-Quality Photos on Mobile Devices with Deep Convolutional Networks", In Proceedings of Computer Vision and Pattern Recognition, Apr. 8, 2017, 15 Pages.

"International Search Report and Written opinion Issued in PCT Application No. PCT/US18/029489", dated Aug. 2, 2018, 14 Pages.

Schulter, et al., "Fast and accurate image upscaling with super-resolution forests", In Proceedings of IEEE Conference Vision and Pattern Recognition (CVPR), IEEE, Jun. 7, 2015, 9 Pages.

"Neural Enhance", http://web.archive.org/web/20161213001442/https:/github.com/alexjc/neural-enhance, Published on: Dec. 13, 2016, 5 pages.

Choudhury, et al., "A framework for robust online video contrast enhancement using modularity optimization", In Journal of IEEE Transactions on Circuits and Systems for Video Technology, vol. 22, Issue 9, Sep. 2012, pp. 1-14.

* cited by examiner

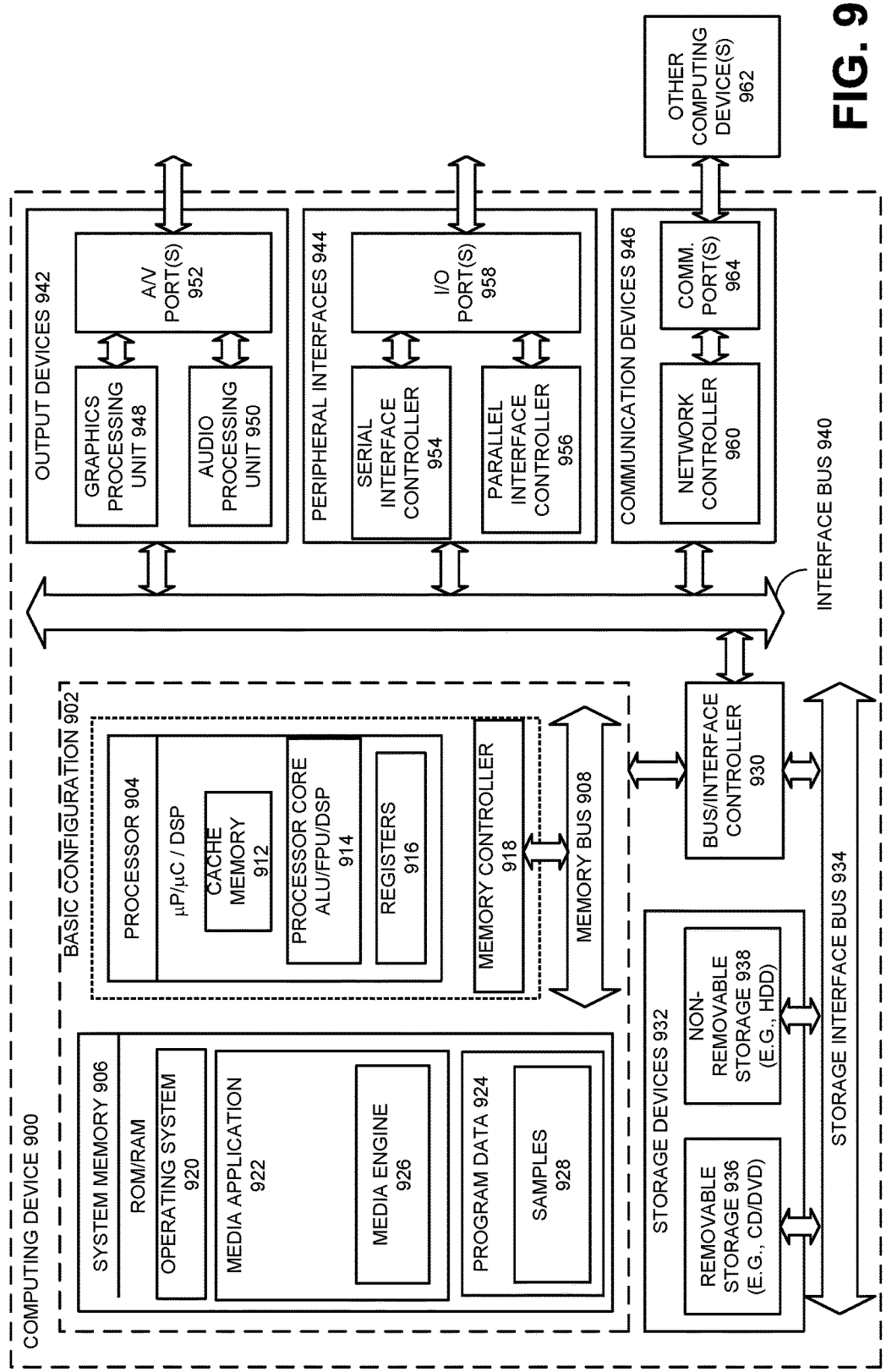

IMAGE RESOLUTION ENHANCEMENT

TECHNICAL FIELD

This disclosure relates to image enhancement using artificial neural networks.

BACKGROUND

Portable computing devices such as smartphones and tablet computers are typically equipped with digital cameras. The quality of the images captured by a digital camera is typically dependent upon the sophistication of the camera and its components, such as the camera's lenses and image sensors. Features such as digital zoom or greater image quality may sometimes be achieved by application of techniques which improve the resolution of images acquired by a digital camera.

One approach to improving image resolution involves the use of neural networks, which can be trained to improve the resolution of images. Neural networks may, for example, be trained to infer the value of missing pixels in an enhanced-resolution image. However, training such networks remains challenging, and images scaled using neural networks may be prone to introducing various artifacts and distortions into the enhanced image.

SUMMARY

Methods, systems, and computer program products for enhancing the resolution of image data are described herein. In particular, described herein are methods, systems, and computer program products which obtain image data from a camera and enhance the resolution of the image data using a artificial neural network. In disclosed embodiments, the artificial neural network is trained based at least in part by acquiring image data at a resolution that is less than the resolution of image data obtained from a first camera. This lower-resolution image data is scaled to the resolution of the first camera, and errors, distortion, and artifacts created by the scaling are identified and incorporated into the training of the artificial neural network.

In an embodiment, an apparatus comprises a first camera operable to obtain first image data in a first resolution, and a second camera operable to obtain second image data with less resolution than the first resolution. The apparatus further comprises at least one processor and at least one memory. The at least one memory has stored thereon instructions that, when executed by the at least one processor, causes the apparatus to enhance the resolution of image data obtained from a first camera. The apparatus obtains image data from the first camera and applies a neural network to the image data to scale it to a second resolution that is greater than the first resolution. The neural network is trained using additional image data that is received from a second camera and scaled to the resolution of the first camera.

BRIEF DESCRIPTION OF THE DRAWINGS

FIG. 9 depicts an example computing device on which aspects of the present disclosure may be practiced.

DETAILED DESCRIPTION OF ILLUSTRATIVE EMBODIMENTS

Figure 1:
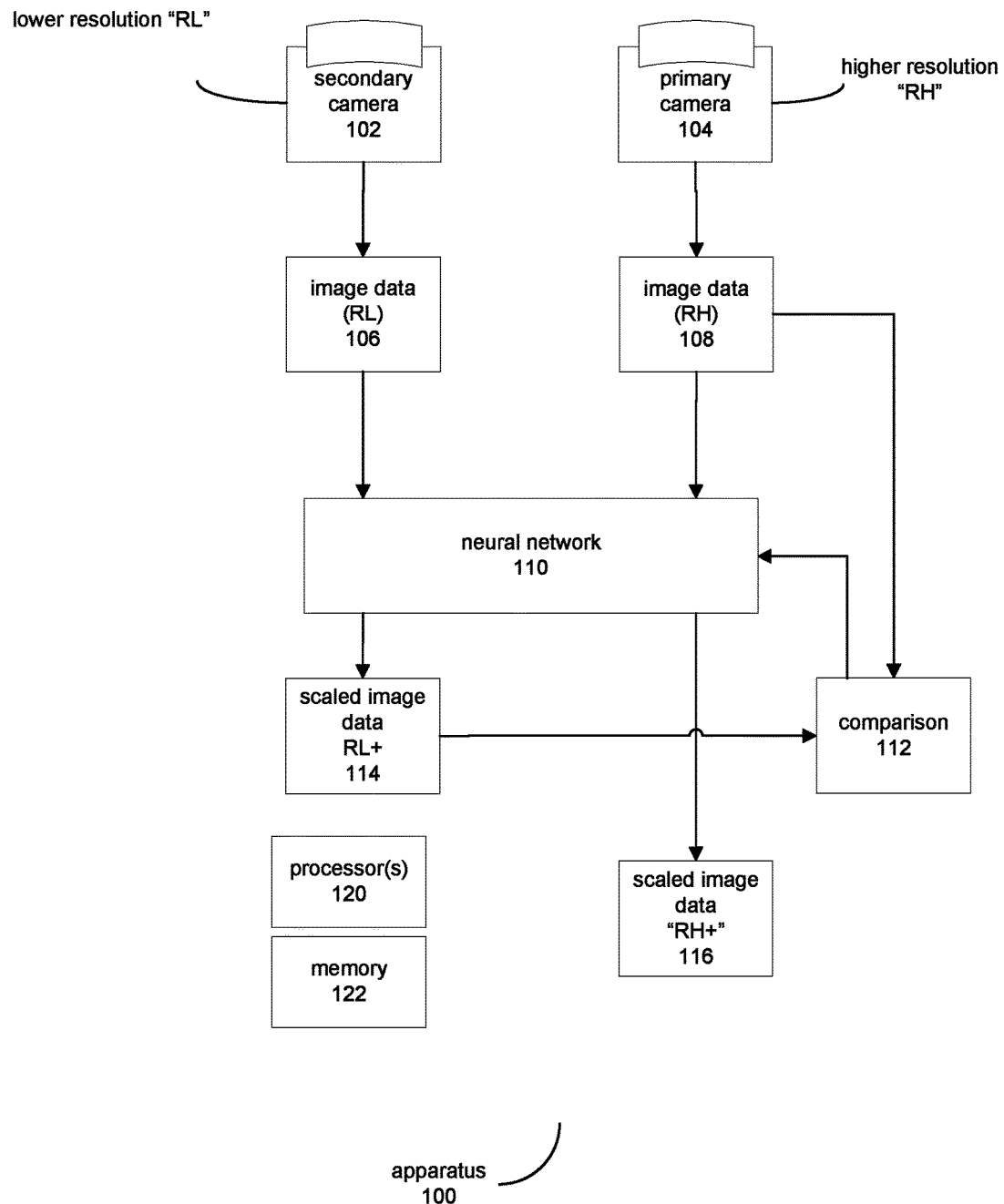
FIG. 1 depicts an example of an apparatus for scaling image data.

In an embodiment, an apparatus comprises a first camera. The first camera is operable to obtain image data in a first resolution. The image data from the first camera is scaled to a higher resolution by applying a neural network to the image data in the first resolution. The neural network used to scale the image data is trained based at least in part on scaling image data from a lower resolution to that of the resolution of the first camera.

In an embodiment, the apparatus comprises at least one processor and at least one memory. The at least one processor is operable to execute instructions stored in the at least one memory. By operation of the at least one processor, the apparatus receives image data in a first resolution from a first camera, and receives additional image data in a lower resolution from another source, such as a second camera. The apparatus, by operation of the at least one processor, may scale the image data from the first resolution to a higher resolution. The scaling may comprise the at least one processor applying a neural network to the image data from the first camera.

The neural network may be trained by scaling the additional image data, at the lower resolution, to the resolution of the image data from the first camera. In an embodiment, the scaled additional image data is compared to the unscaled image data obtained from the first camera. Information obtained from the comparison is then used in the training of the neural network. Thus, the neural network may be trained in view of various possible errors, distortions, and artifacts that may be introduced by scaling from the lower resolution to the resolution of the first camera, thereby improving the neural network's ability to scale image data from the resolution of the first camera to a higher resolution.

Neural networks are an example of a class of machine learning techniques in which coefficients of the non-linear function are determined by an optimization process. The optimization process, sometimes referred to as training, may be an iterative process in which the coefficients are adjusted to produce a desired output, such as scaled image data. In addition to neural networks, other examples which employ a training method to generate coefficients for a non-linear function include genetic algorithms and decision forests. Embodiments of the present disclosure may include non-linear functions whose coefficients were generated using the techniques described herein.

In an embodiment, an apparatus may comprise a first camera and a second camera. In some instances, the first camera may have a maximum resolution that is greater than the maximum resolution of the second camera. The apparatus further comprises at least one processor and at least one memory. The at least one processor is operable to execute instructions stored in the at least one memory. By operation of the at least one processor, the apparatus obtains image data in a first resolution from a first camera, and obtains additional image data in a lower resolution from the second camera. The image data may correspond to the same subject matter, and may be taken contemporaneously.

By operation of the at least one processor, the apparatus scales image data from the second camera from the lower resolution to the resolution of the image data obtained from the first camera. The apparatus scales the image data from the second camera by application of a neural network.

By operation of the at least one at least one processor, the apparatus then scales image data from the first camera to a higher resolution. The image data from the first camera may be scaled by application of a neural network. Input to the neural network may comprise the image data from the first camera and information obtained by scaling the lower-resolution image data from the second camera to the resolution of the first camera. This information may include image data from the second camera and/or the scaled image data from the second camera. In some cases, the information input to the neural network comprises information indicative of errors, distortion, or artifacts introduced into the image by scaling from the lower resolution to the resolution of the first camera.

As used herein, the designation "RH" refers to the resolution of image data obtained from the primary camera 104 and the designation "RH+" refers to an enhanced resolution obtained by scaling image data at RH resolution. Likewise, the designation "RL" refers to a lower resolution, such as the resolution of image data that may obtained from the secondary camera 102. The designation "RL+" refers to an enhanced resolution obtained by scaling image data at RL resolution.

FIG. 1 depicts an example of an apparatus for scaling image data from resolution RH to resolution RH+. An apparatus 100 may comprise two cameras 102, 104. A primary camera 104 may be operable to receive image data 108 at a higher resolution RH than the image data 106 obtained from a secondary camera 102 at a resolution RL. In some instances, the maximum resolution of the primary camera 104 may be greater than the maximum resolution of the second camera. In other instances, the secondary camera 102 may be configured or operated to provide images at lower resolution than the primary camera 104. Application of a neural network 110 to the image data 108 from the primary camera 104 may form scaled image data 116. The image data is thus scaled from RH to RH+ by application of the neural network 110.

A camera, such as the depicted cameras 102, 104 may refer to devices for obtaining image data. For example, a camera may include an optical sensor such as a charge-coupled device ("CCD") image sensor or a complementary metal oxide semiconductor ("CMOS") image sensor. In an embodiment, a camera 102, 104 may include a lens. In another embodiment, a camera 102, 104 may include fiber optic cabling. In an embodiment, a camera 102, 104 may be configured to be in communication with at least one processor 120 and at least one memory 122. The at least one processor 120 and at least one memory 144 may be components of the apparatus 100. Image data from the cameras 102, 104 may be received by the apparatus by reading image sensor data from a camera 102, 104 and storing, by operation of the at least one processor, the image data 106, 108 in the at least one memory.

A neural network 110 may comprise representations of network nodes. The neural network 110 may be referred to as an artificial neural network, connectionist network, and/or parallel distributed processing network. The network nodes may sometimes be referred to as neurons, artificial neurons, and/or units. The representations may comprise network topology, weights, and activation functions used to apply the neural network to image data from the cameras 102, 104. In an embodiment, the representations of the network nodes may be stored in the at least one memory 122 and accessed by the at least one processor 120.

By operation of the at least one processor, image data 108 from the primary camera 104 may be scaled from resolution RH to RH+. For example, if the primary camera has a resolution of ten megapixels, the image data 108 may be scaled to twenty megapixels. In this example, the scaling factor of the scaling from RH to RH+ would be 2×. It will be appreciated that the indicated resolution values and scaling factor are provided for illustrative purposes and should not be construed as limiting.

In an embodiment, the secondary camera 102 may obtain image data 106 at a resolution RL that is less than the resolution RH of image data 108 obtained from the primary camera 104. Continuing the previous example, the secondary camera may obtain image data 106 having a resolution of five megapixels, compared to the ten megapixels of the primary camera 104. Note that, in this example, the ratio between the image data obtained from the secondary camera 102 and the primary camera 104 is also 2×. Thus, the scaling ratio from RH to RH+ is the same (or nearly the same) as the scaling ratio from RL to RL+. Thus, a common scaling factor is applied to the images from both cameras. The resolution of the scaled image data 114 from the secondary camera 102, at ten megapixels, may be essentially equivalent to the resolution of the image data 108 from the primary camera 104, also ten megapixels. Here too, it will be appreciated that the indicated resolutions and scaling factors are provided for illustrative purposes and should not be construed as limiting.

In an embodiment, the image data 106 from the secondary camera 102 may be used to train the neural network 110. In this embodiment, the image data 106 from the secondary camera 102, at resolution "RL," is scaled by application of the neural network 110 to a resolution RH. Continuing the previous example, the secondary camera 102 may capture image data at 5 megapixels. The image data 106 from the secondary camera 102 may be scaled, by application of the neural network, from 5 megapixels to 10 megapixels. A comparison unit 112 may compare image data 108 from the primary camera 104 to the scaled image data 114. Thus, continuing the previous example, the 5 megapixel image data 106 from the secondary camera 102 may be scaled by application of the neural network 110 from 5 megapixels to 10 megapixels, and then compared with the unscaled 10 megapixel data 108 from the primary camera 104.

In an embodiment, output of the comparison unit 112 may be used to train the neural network 110. In an embodiment, the comparison unit 112 outputs error or distortion metrics pertinent to the scaled image. These may be referred to as error values. The error or distortion values from the comparison unit 112 may then be used to adjust the weights, threshold values, and so forth of the neural network 110. Embodiments may adjust the weights, threshold values, and so forth to minimize the errors or distortion observed by scaling the lower-resolution image data 106 to higher-resolution, scaled image data 114.

In an embodiment, the scaled image data 114 from the secondary camera may be supplied as input to the neural network 110. In a further embodiment, output of the comparison unit 112 may also be supplied as input to the neural network 110. Information obtained from scaling the image data 106 may also be used, in various combinations, as both input to the neural network 110 and as a basis of training the neural network 110.

In an embodiment, a non-linear function (not shown) is used in place of the neural network 110. The coefficients of the non-linear function may be determined based on a training process similar, though not necessarily identical, to the one depicted by FIG. 1. The process may, for example, comprise a generation operation in which one or more candidate non-linear functions are generated, and an evaluation operation in which the one or more candidates are evaluated. The evaluation process may, for example, comprise scaling RL image data to RL+ and comparing the RL+ data to RH image data obtained from the primary camera 104.

Figure 2A:
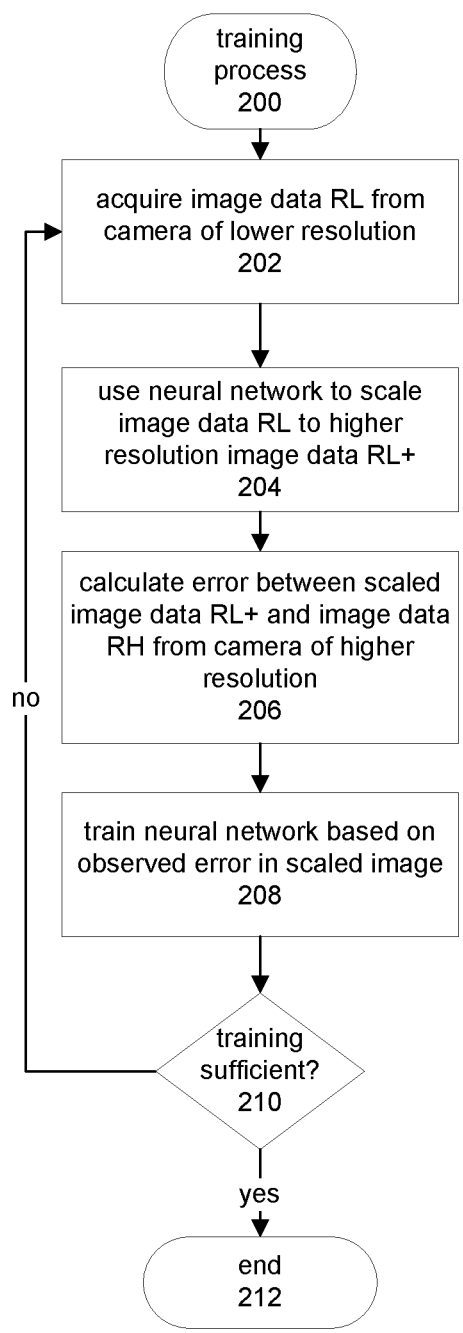
FIG. 2A depicts an example process of training a neural network to scale image data.

FIG. 2A depicts an example process for scaling image data. It will be appreciated that, although FIG. 2A is depicted as a sequence, the depicted sequence is not intended to be construed as limiting. Rather, the depicted sequence should be viewed as illustrative of an embodiment, variants of which may comprise operations that, with respect to FIG. 2A, are altered, reordered, combined, or performed in parallel.

A training process 200 may involve an apparatus having a primary camera capable of obtaining image data at resolution RH that is to be scaled to an enhanced resolution RH+. As depicted by element 202, the training process may comprise acquiring image data RL from a camera that has less resolution than the primary camera. With reference to FIG. 1, the image data may, for example, be obtained from a secondary camera 102 that, in some embodiments, is included in the apparatus with a primary camera 104. In other embodiments, the secondary camera is external to the apparatus that houses the primary camera.

Element 202 depicts that the process may comprise application of a neural network to the image data RL acquired by the secondary camera, forming scaled image data of resolution RL+. For example, with respect to FIG. 1, the at least one processor of the apparatus may calculate signal propagation through the neural network given a set of input data that comprises the image data RL. The output of the network may comprise scaled image data RL+ at an enhanced resolution. In an embodiment, the resolution of the scaled image data RL+ corresponds to the resolution of the primary camera.

Element 204 depicts calculating error metrics for the scaled image data RL+. The error metrics may be calculated with respect to reference image data at resolution RH. As noted, in an embodiment the resolution RL+ of the scaled image data RL may correspond to the resolution RH of images obtained from the primary camera. In some embodiments, however, RL+ may be less than RH.

Element 206 depicts training the neural network based on the error metrics. In an embodiment, the parameters of the neural network are adjusted in an iterative process having a goal of minimizing the distortion or artifacts of scaling that are represented in the error metrics. In an embodiment, the error metrics are representative of errors occurring within certain regions of the image data. Training the neural network with respect to scaling from a lower resolution RL to the higher resolution RH of the primary camera may, in some embodiments, permit adaptation to the artifacts or distortion that may occur in particular regions of a photograph. For example, some types of image distortion or artifacts may be more common in portions of an image that contain repeating patterns or textures.

The training process comprising elements 202-208 may be repeated until it is determined, at element 210, that the neural network has been sufficiently trained. For example, the training process may terminate or be suspended, as depicted by elements 210 and 212, when the observed error falls below some threshold amount.

Figure 2B:
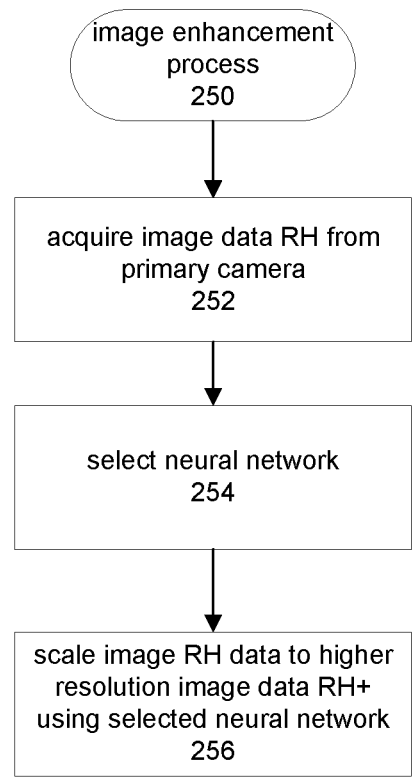
FIG. 2B depicts an example process for scaling image data.

FIG. 2B depicts an example process for scaling image data. It will be appreciated that the sequence depicted by FIG. 2B is not intended to be construed as limiting. Rather, the depicted sequence should be viewed as illustrative of an embodiment, variants of which may comprise operations that, with respect to FIG. 2B, are altered, reordered, combined, or performed in parallel.

The image enhancement process 250 may scale image data at resolution RH to an enhanced resolution RH+. This scaling may be described as scaling by a factor $F_1$. The image enhancement process 250 may involve a neural network that was trained by scaling image data at resolution RL to a resolution of RL+. This may be described as scaling by a factor $F_2$, where $F_2$ is essentially equivalent to, i.e. is approximately equal to, $F_1$. The range of equivalency may be determined during training of the network, based for example on the quality of scaling produced when scaling by a factor of $F_1$.

Element 252 depicts acquiring image data of a resolution RH. With reference to the example of FIG. 1, the image data RH may be acquired from the primary camera 104 of the apparatus 100.

A neural network trained via the process depicted in FIG. 2A may be applied to the image data RH. As depicted by element 254, embodiments may select one or more neural networks to scale the image data. In an embodiment, the neural network may be selected based on a classification of the image data being scaled. For example, an embodiment may determine that the region is dominated by a texture, pattern, or other characteristic, and that a particular network is well suited to scaling image data containing that characteristic. Multiple networks may be selected; each may be used for a different region of the image.

In an embodiment, a secondary camera may acquire image data at RL resolution, and then perform a plurality of scaling operations on the data, using a plurality of neural networks. Each of the networks thus may scale the same image data from RL to RL+. The embodiment may then compare the resulting image data RL+ to data obtained from a primary camera at RH resolution, to determine which network is best suited to scale the image data. In some embodiments, this process may be applied to multiple regions of an image, and a potentially different network is selected for each region. The primary and secondary cameras may each capture an image corresponding to the same subject matter. The images may be acquired contemporaneously. Thus, the two images may each be subdivided into regions, each of which corresponds to a common region of the depicted subject. Each region may then be scaled independently, and in some cases each region may employ a neural network selected for that region. In an embodiment, the neural network is selected based on scaling an image from the secondary camera, at resolution RL, to the resolution of the primary camera RH.

By application of one or more of the selected neural network, the image data RH may be scaled to the resolution RH+. This step is depicted by element 256. The application process may include supplying pixel, pixel components, or other aspects of the image data RH to the input of the neural network, calculating the inputs and outputs of successive nodes of the network, and calculating output of the network, i.e. image data scaled to RH+.

Figure 3A:
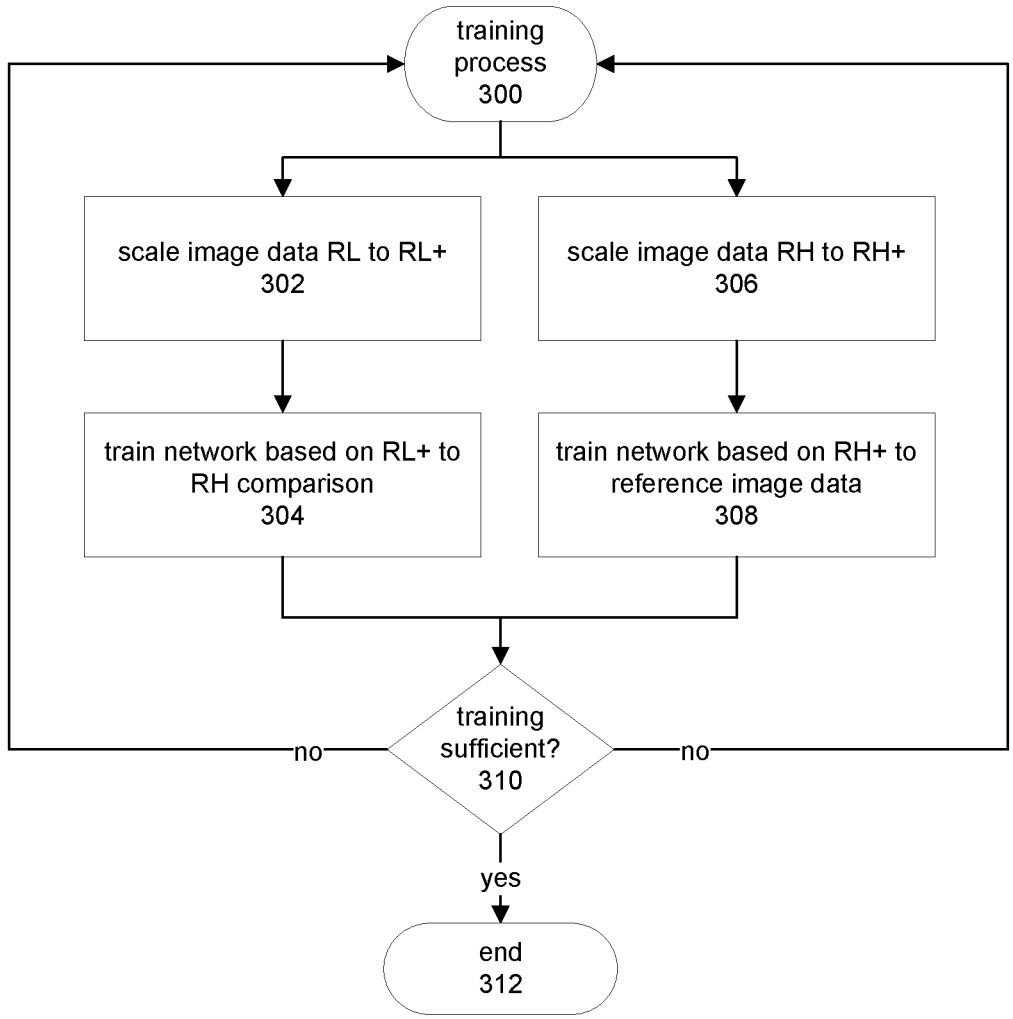
FIG. 3A depicts a further example of training a neural network to scale image data.

FIG. 3A depicts a further example of training a neural network to scale image data. It will be appreciated that, although FIG. 3A is depicted as a sequence of elements, the depicted sequence is not intended to be construed as limiting. Rather, the depicted sequence should be viewed as illustrative of an embodiment, variants of which may comprise operations that, with respect to FIG. 3, are altered, reordered, combined, or performed in parallel.

A training process 300 may be based on data from two sources, such as the primary camera 104 and the second camera 102 of FIG. 1 Image data from the secondary camera may be scaled from RL to RL+, and the scaled image at RL+ resolution compared to a reference image of at least RL+ resolution. Image data from the primary camera 104 may be scaled from RH to RH+, and the scaled image at RH+ compared to a reference image of at least RH+ resolution. In an embodiment, a third camera is used to obtain a reference image of at least RH+ resolution. In another embodiment, a camera operative in multiple resolution modes captures multiple images of the requisite resolutions.

Element 302 depicts scaling image data from RL to RL+. With reference to the embodiment depicted in FIG. 1, the RL image data may be obtained from a secondary camera 102 and then scaled, by application of a neural network, to RL+. Then, as depicted in element 304, the network may be trained based on a comparison between the RL+ data and RH data obtained from the primary camera 104.

Element 306 depicts scaling image data RH to RH+. The image data RH may be obtained from the primary camera 104. As depicted by element 308, the network may be trained based on comparisons of the scaled image data RH+ to reference image data at a resolution that is at least as high as RH+.

Note that the training operations depicted by elements 304 and 308 are not necessarily distinct steps. The neural network may be trained with respect to both scaling from RL to RL+ and from RH to RH+ simultaneously.

Element 310 depicts that the training process may be iterative. Sufficiency of the training may, for example, be measured based on the quality of RH to RH+ scaling. If scaling from RH to RH+ produces scaled images with a desired quality, for a desired set of inputs, the network may be deemed sufficiently trained, and the process may end as depicted by element 312. If not, the operations depicted by 300-308 may be repeated.

Figure 3B:
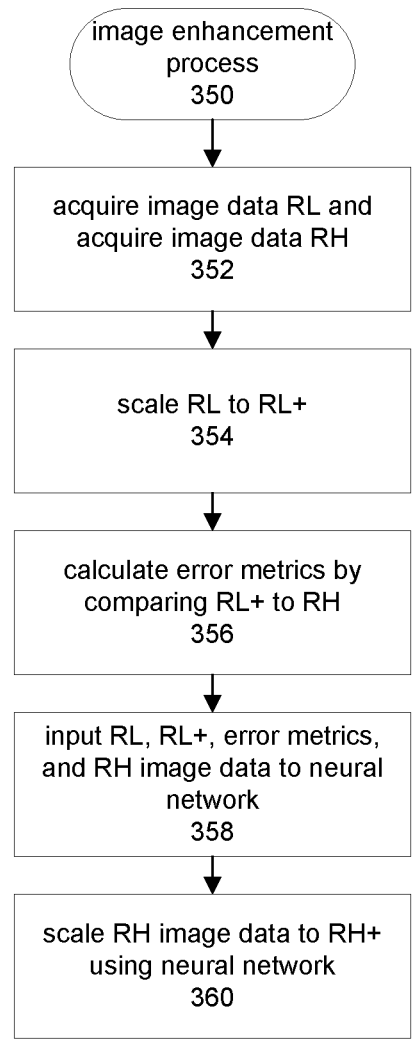
FIG. 3B depicts a further example of scaling image data.

FIG. 3B depicts a further example of scaling image data. It will be appreciated that, although FIG. 3A is depicted as a sequence of elements, the depicted sequence is not intended to be construed as limiting. Rather, the depicted sequence should be viewed as illustrative of an embodiment, variants of which may comprise operations that, with respect to FIG. 3, are altered, reordered, combined, or performed in parallel.

An image enhancement process 350 may be employed to perform a scaling operation on image data acquired at RH resolution. The process 350 may involve acquisition and scaling of data acquired from a primary camera at RH resolution and from a secondary camera at RL resolution.

Element 352 depicts acquisition of image data at resolutions RL and RH. With reference to FIG. 1, the image data RL may be acquired from the secondary camera 102 and the image data RH from the primary camera 104. Other camera configurations, such as a single camera configuration, might also be employed in certain embodiments to acquire image data at both resolutions.

Element 354 depicts using the neural network to scale the low-resolution image data RL to RL+. Then, as depicted by element 356, error metrics may be determined for the scaled image data RL+, by comparing the scaled image data RL+ to image data RH taken from the primary camera.

As depicted by element 358, input to a neural network may comprise the image data RL, image data RL+, the error metrics, and the image data RH. In various embodiments, fewer inputs are used. For example, in an embodiment image data RL, image data RL+, and image data RH is input. In another embodiment, only image data RL and image data RH is input. Note that with respect to FIG. 3A, the training steps 304 and 308 may be adjusted to correspond to the input that is supplied to the neural network. Element 360 depicts that the neural network may then be applied to the input data, in order to calculate an output comprising the image data scaled to RH+ resolution.

In an embodiment, the error metrics input to the neural network are representative of errors occurring within certain regions of the image data. This may permit adaptation to the artifacts or distortion that may occur in particular regions of a photograph, such as in regions that contain repeating patterns or textures. In some cases, input to a neural network may comprise multiple sets of data corresponding to regions of an image, where each set may comprise some combination of image data RL, scaled image data RL+, and/or error metrics for the scaling from RL to RL+, obtained with respect to RH data from the corresponding region.

Figure 4:
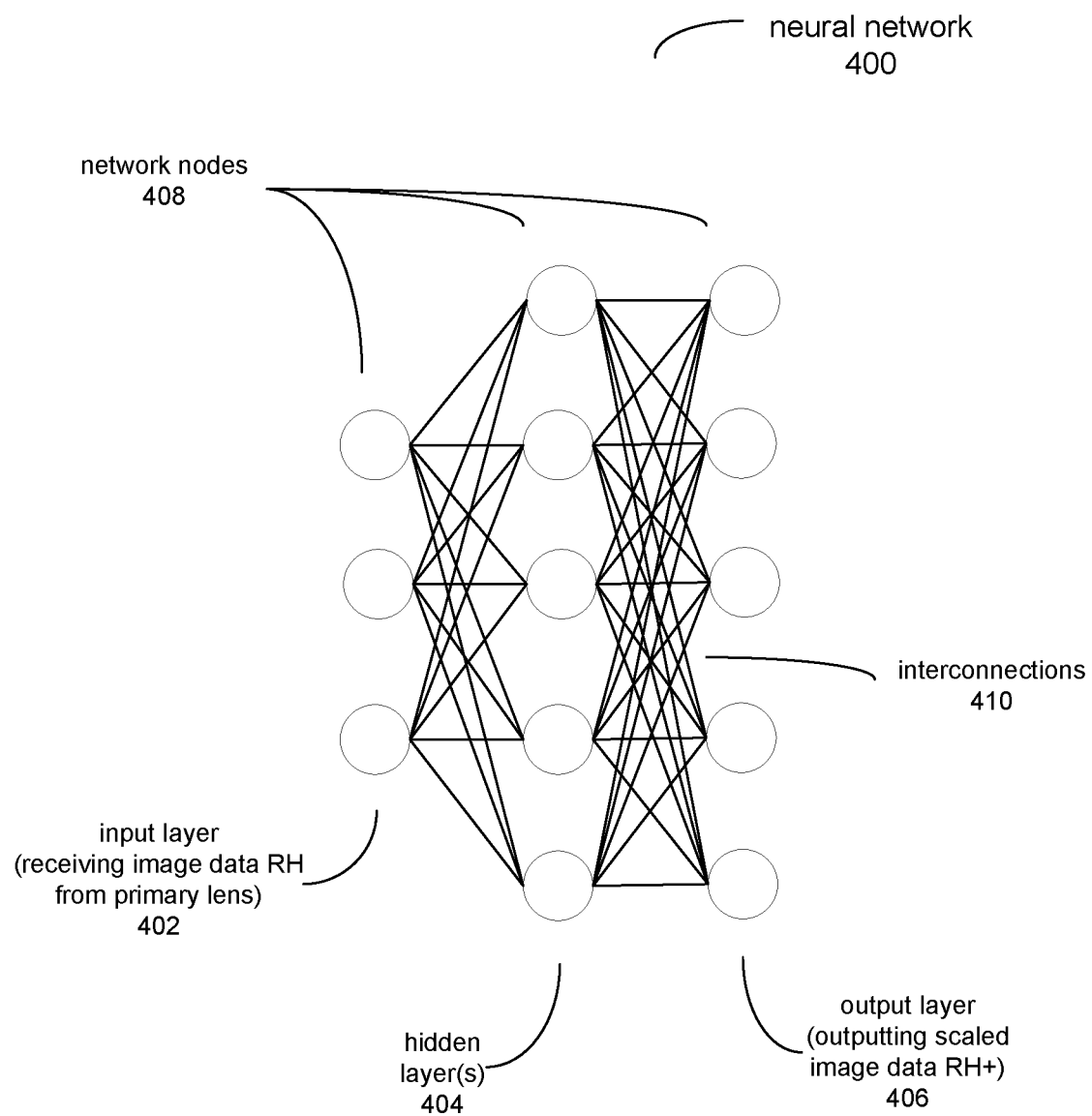
FIG. 4 depicts an example of scaling image data by a neural network.

FIG. 4 depicts an example of scaling image data by a neural network. A neural network 400 may comprise a plurality of network nodes 408. A variety of network structures may be employed. In an embodiment, topology of the neural network 400 may comprise an input layer 402, one or more hidden layers 404, and an output layer 406. Each of the layers 402-406 comprises one or more of the network nodes 408. The nodes 408 and layers 402-406 may be connected via interconnections 410.

In an embodiment, a node of the neural network 400 is associated with or comprises one or more weights on input(s) to the node and one or more activation functions on output(s) from the node. Inputs to a node at the input layer 402 may be propagated through the hidden layer(s) 404 to the output layer 406. The input signals are, in the course of propagation, adjusted by the weights, combined with other signals, and subjected to threshold functions.

The parameters of the neural network 400, including weights, threshold values, and so on, may be adjusted during a training process. As described herein, the training process may include identifying errors and distortions introduced by scaling image data from RL to RL+ and comparing to image data RH from a primary camera, where the RL:RL+ ratio corresponds to the RH:RH+ ratio.

In the example of FIG. 4, the input layer 402 is supplied input comprising image data RH from a primary lens. Output data comprises scaled image data RH+. In an embodiment, a node of the input layer 402 is supplied with data corresponding to a pixel of the input image data RH, and a node of the output layer 406 outputs data corresponding to a pixel of the output image data RH+.

Figure 5:
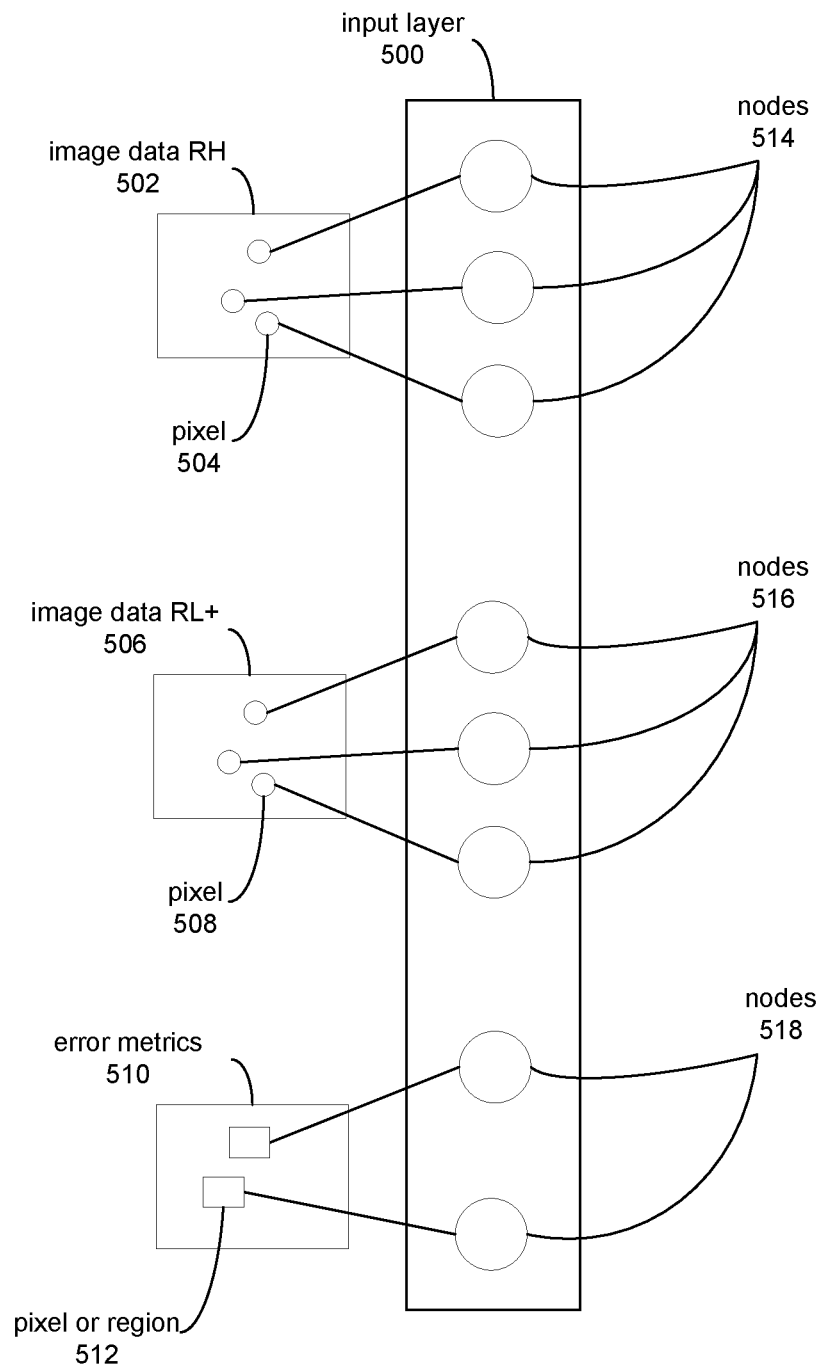
FIG. 5 depicts an example of an input layer of a neural network configured to scale image data.

FIG. 5 depicts an example of an input layer of a neural network configured to scale image data. An input layer 500 might comprise various nodes 514-518. Application of the neural network may comprise calculating outputs of each of the nodes 514-518 of the input layer 500 and propagating those inputs through additional layers of the neural network to calculate an output.

In an embodiment, a portion of the input layer 500 comprises nodes 514 that are supplied inputs corresponding to pixels 504 of image data RH 502, such as image data from the primary camera.

In an embodiment, a portion of the input layer 500 comprises nodes 516 that are supplied inputs corresponding to pixels 508 of scaled image data that has been scaled from RL resolution to image data scaled to RL+ 506.

In an embodiment, a portion of the input layer 500 comprises nodes 518 that are supplied inputs corresponding to error metrics 510. The error metrics 510 may comprise information indicative of distortion in the image data RL+ that may be detected by comparison with the image data RH obtained from the primary camera.

Although not depicted in FIG. 5, in another embodiment a set of nodes of the input layer 500 may be supplied inputs corresponding to unscaled image data RL from the secondary camera.

It will be appreciated that the architecture depicted in FIG. 5 is intended to be illustrative, and should not, in particular, be viewed as limiting the scope of the present disclosure to those embodiments which employ corresponding neural network architectures. Embodiments may employ alternative neural network architectures. For example, inputs corresponding to image data RH, image data RL+, and error metrics 510 may be supplied as inputs to each of the nodes 514-518, rather than to separate nodes as is depicted in FIG. 5.

Figure 6:
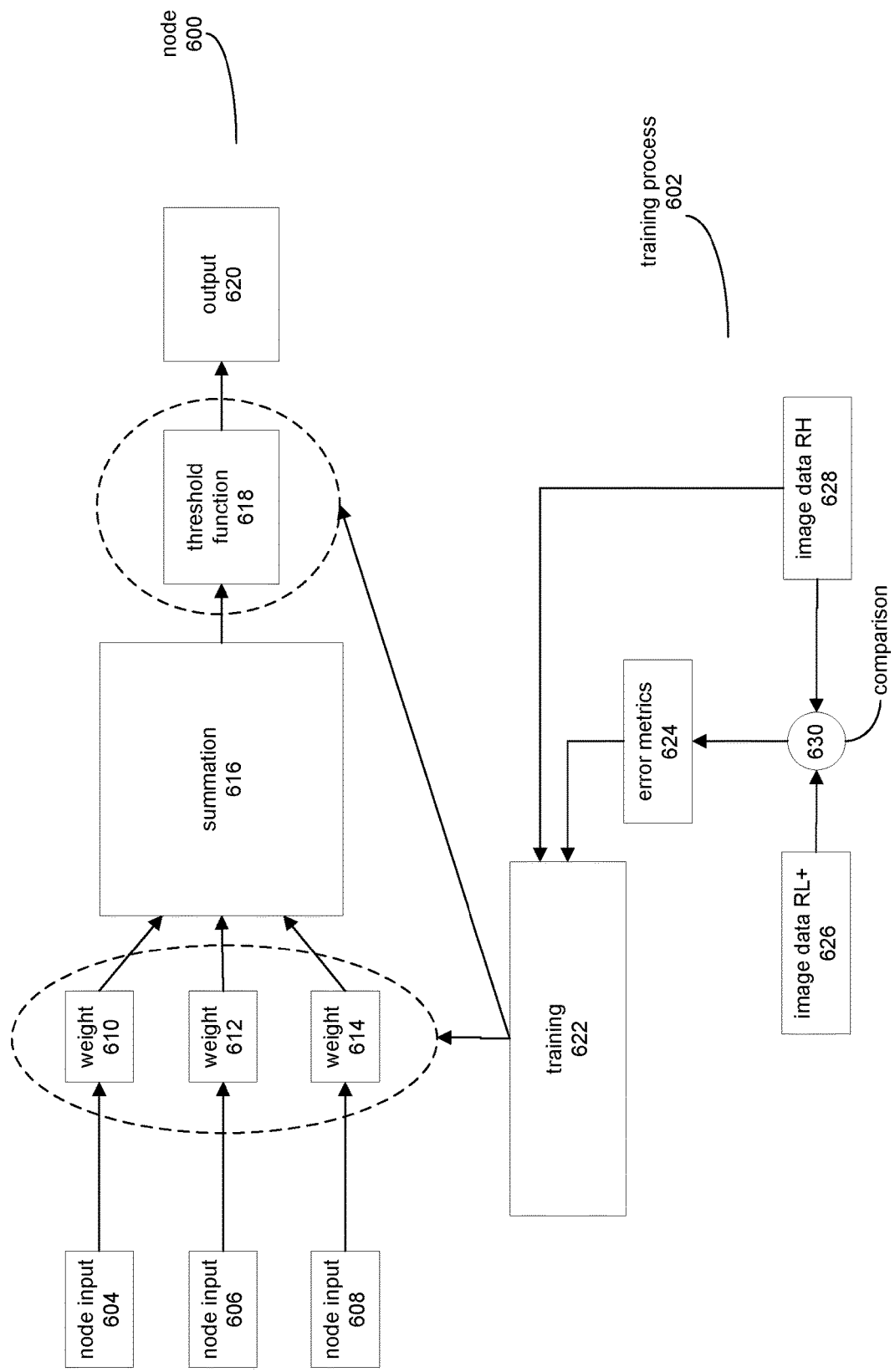
FIG. 6 depicts an example of a network node.

FIG. 6 depicts an example of a neural network node. A node 600 may comprise node inputs 604-608, weights 610-614, a summation module 616, a threshold function module 618, and an output 620.

Each node input 604-608 may carry a signal adjusted by a corresponding weight 610-614 and then combined by the summation module 616. The output of the summation module 616 may then be supplied to the threshold function 618. The threshold function 618 may include, for example, a step function, sigmoid function, or other function acting on input from the summation module 616 to produce an output 620. The node 600 may include various adjustable parameters, including but not limited to the weights 610-614, values related to the operation of the threshold function 618, and so forth.

A training module 622 may, in an iterative process, refine parameter values of the node 600 to improve the operation of the neural network comprising the node 600. The iterative process may involve acquisition of image data RL, scaling of the image data RL to a higher resolution RL+ 626, and comparison of the scaled image data RL+ 626 to unscaled reference image data RH 628. A comparison module 630 may form error metrics 624 as a measure of differences, distortion, artifacts, and so forth identified by comparing the scaled image data RL+ 626 to the reference image data RH 628.

Figure 7:
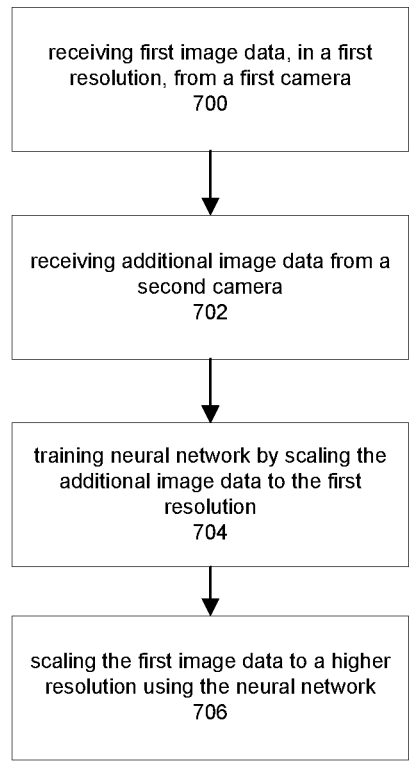
FIG. 7 depicts an example process for scaling image data.

FIG. 7 depicts an example process of scaling image data. It will be appreciated that, although FIG. 7 is depicted as a sequence of elements, the depicted sequence is not intended to be construed as limiting. Rather, the depicted sequence should be viewed as illustrative of an embodiment, variants of which may comprise operations that, with respect to FIG. 7, are altered, reordered, combined, or performed in parallel.

Element 700 depicts receiving first image data, in a first resolution, from a first camera. The first image data, from the first camera, may be scaled from the first resolution RH to a second resolution RH+ that is greater than the first resolution RH. The scaling ratio between RH and RH+ may be by a scaling factor $F_1$.

Element 702 depicts receiving additional image data from a second camera. The second camera may have a resolution capability RL that is less than the resolution RH of the first camera. In an embodiment, the second camera has a resolution capability RL such that the additional image data may be scaled to a resolution that is essentially equivalent to RH, such that the scaling is by a factor $F_2$ that is essentially equivalent to $F_1$.

Element 704 depicts training a neural network by scaling the additional image data to a resolution RL+ that is essentially equivalent to the first resolution RH. In an embodiment, the additional image data is scaled by a factor $F_2$ that is essentially equivalent to $F_1$. Variances in lenses, sensors, and so forth may result in slight differentiations in the resolutions RL, RL+, RH, and RH+, and of the scaling factors $F_2$ and $F_1$.

In an embodiment, error metrics are calculated based on a comparison of the scaled image data RL+ to a corresponding image data from the first camera. In an embodiment, the metrics comprise values indicative of error, distortion, and/or artifacts found in the scaled image data RL+.

In an embodiment, parameters of the neural network are stored in one or more memories. By action of a processor, the parameters may be adjusted based at least in part on the identified error metrics. The adjusted parameters may include the weights associated with various nodes of the neural network and values controlling the operation of threshold functions.

Element 706 depicts scaling the first image data from the first resolution to a higher resolution, using the neural network. The resolution may be scaled by a factor $F_1$. The scaling factor may be essentially equivalent to the factor $F_2$ by which image data from the additional camera was scaled during the training process.

Figure 8:
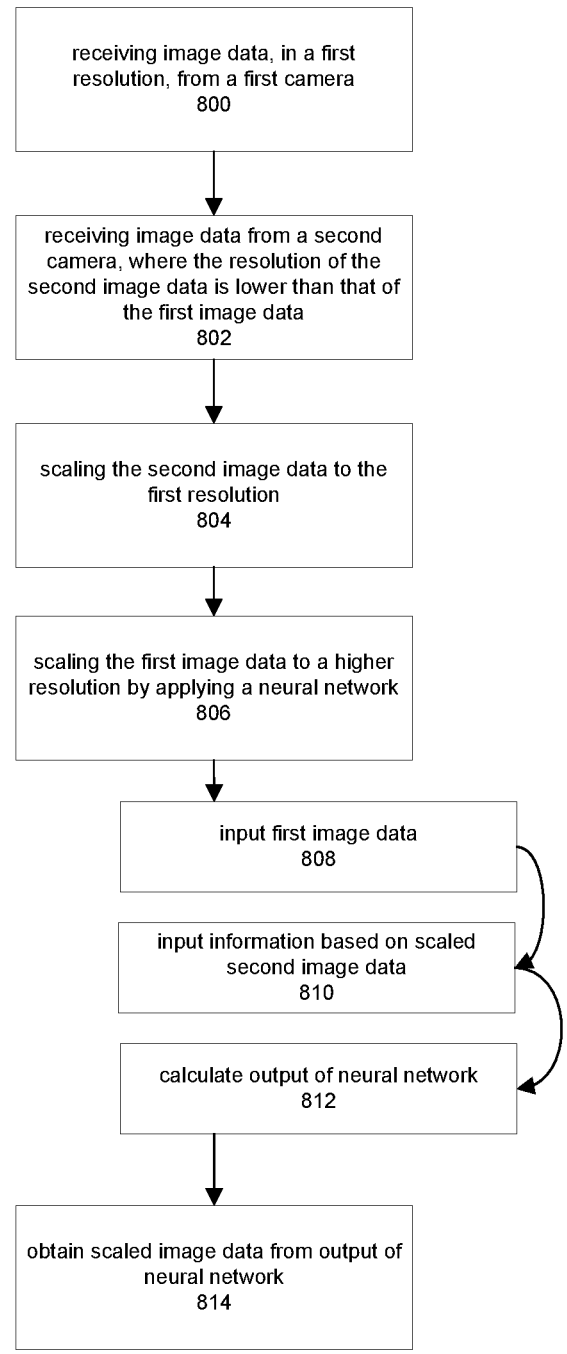
FIG. 8 depicts a further example process for scaling image data.

FIG. 8 depicts a further example process for scaling image data. Although FIG. 8 is depicted as a sequence of elements, the depicted sequence is not intended to be construed as limiting. Rather, the depicted sequence should be viewed as illustrative of an embodiment, variants of which may comprise operations that, with respect to FIG. 7, are altered, reordered, combined, or performed in parallel.

Element 800 depicts receiving image data in a first resolution RH from a first camera. Element 802 depicts receiving image data from a second camera, in a resolution RL that is lower than the resolution of the image data from the first camera.

In an embodiment, the image data from the first and second cameras is obtained contemporaneously. The image data from each of the cameras may correspond to the same subject matter. For example, each of the two cameras may record an image of the same subject, using the same or similar framing. In some cases, the framing may not be identical. For example, the framing of the subject in the first camera may correspond to the desired framing of an image to be scaled to RH+, while the framing of the subject in the second camera may be a close-up or zoomed-in image of the subject. For example, the framing employed by the second camera might be a zoomed-in subset of the framing employed by the first camera.

Element 804 depicts scaling the image data from the second camera. The image data from the second camera may be scaled to a resolution RL+ that corresponds to the first resolution RH of the image data obtained from the first camera. In an embodiment, the scaling is performed by a neural network. In another embodiment, the neural network is the network employed, in element 806, to scale the first image data to a higher resolution RH+. In other embodiments, the neural network used to scale the second image is a replica of at least a subset of the neural network employed, in step 806, to scale the first image data. In another embodiment, the neural network employed to scale the image data from the second camera is different than the neural network employed in element 806 to scale the first image data.

Element 806 depicts scaling the first image data at the first resolution RH to a higher resolution RH+ by applying a neural network to the first image data. Application of the neural network to the first image data may comprise the operations depicted by elements 808-812. As depicted by element 808, the first image data may be supplied as an input to the neural network. The input may also, as depicted by element 810, comprise information based on the scaled second image data.

In an embodiment, the information based on the scaled second image data, supplied as input to the neural network, may comprise error information. The error information may be based on comparing the scaled second image data at resolution RL+ to the first image data at resolution RH.

In an embodiment, the information based on the scaled second image data, supplied as input to the neural network, may comprise the scaled second image data.

In an embodiment, the information based on the scaled second image data, supplied as input to the neural network, may comprise the second image itself In an embodiment, the information based on the scaled second image data, supplied as input to the neural network, may comprise indications of artifacts detected in the scaled second image data.

Application of the neural network may further comprise the operations depicted by element 812. As depicted by element 812, the output of the neural network may be calculated based on the supplied inputs to the trained neural network. After propagation of the input signals through the neural network, an output of a scaled image may be obtained, as depicted by element 814.

In an embodiment, an apparatus may be implemented comprising:

a first camera operable to obtain first image data in a first resolution;

at least one processor; and at least one memory having stored thereon instructions that, when executed by the at least one processor, causes the apparatus to at least:

scale image data from the first camera to a second resolution greater than the first resolution, the image data scaled at least by application of a neural network to the first image data, wherein the neural network is trained based at least in part on scaling additional image data, from a second camera, to the first resolution.

In an embodiment, the first image data and the additional image data are each scaled according to an essentially equivalent scaling factor.

In an embodiment, the first camera has a maximum resolution greater than a maximum resolution of the second camera.

In an embodiment, the at least one memory has stored thereon further instructions that, when executed by the at least one processor, cause the apparatus to at least:

apply the neural network to the image data from the second camera;

calculate an error value based on a comparison of the scaled additional image data to the first image data; and train the neural network based at least in part on the error value.

In an embodiment, the at least one memory has stored thereon a plurality of weights associated with the neural network.

In an embodiment, the at least one memory has stored thereon further instructions that, when executed by the at least one processor, cause the apparatus to at least:

adjust the weights stored in the memory based at least in part on scaled image data from the second camera.

In an embodiment, the memory has stored thereon further instructions that, when executed by the at least one processor, cause the apparatus to at least:

compare scaled image data from the second camera to unscaled image data from the first camera.

In an embodiment, a method may be implemented comprising:

receiving first image data from a first camera in a first resolution; and scaling the first image data to a second resolution higher than the first resolution, the scaling based at least in part on application of a non-linear function to the first image data, wherein coefficients of the non-linear function are selected based at least in part on scaling additional image data to the first resolution.

In an embodiment, each of the first image data and the additional image data is scaled according to a common scaling factor.

In an embodiment, the method further comprises:

receiving the additional image data from a second camera, wherein the second camera has a maximum resolution less than a maximum resolution of the first camera.

In an embodiment, the method further comprises:

comparing the scaled additional image data to the first image data from the first camera.

In an embodiment, the method further comprises:

scaling the additional image data by applying the non-linear function to the unscaled additional image data.

In an embodiment, the method further comprises:

scaling the additional image data by applying a second non-linear function trained independently of the first non-linear function.

In an embodiment, the additional image data is obtained from a second camera.

In an embodiment, the additional image data is obtained from the first camera.

In an embodiment, a computer-readable storage medium may be implemented having stored thereon instructions that, upon execution by a computing device, cause the computing device to at least:

obtain first image data from a first camera in a first resolution; and scale the first image data to a second resolution higher than the first resolution, by at least applying a neural network to the first image data, the neural network trained at least in part by scaling additional image data to the first resolution.

In an embodiment, the second camera obtains image data scalable to the first resolution by a scaling factor, and wherein scaling the first image data to the second resolution is by a factor essentially equivalent to the scaling factor.

In an embodiment, the computer-readable storage medium has stored thereon further instructions that, upon execution by the computing device, cause the computing device to at least:

apply the neural network to the additional image data; and train the neural network based at least in part on comparison between the scaled additional image data and the first image data.

In an embodiment, the computer-readable storage medium has stored thereon further instructions that, upon execution by the computing device, cause the computing device to at least:

adjust weights of the neural network based at least in part on scaled image data from a second camera, wherein the weights are stored in a memory of the computing device.

In an embodiment, applying the neural network comprises calculating an output of a node of the neural network, the output based at least in part on at least one input, at least one weight, and an activation function.

FIG. 9 and the associated discussion are intended to provide a brief, general description of a general purpose computing device, which may be used in conjunction with various aspects of the present disclosure.

For example, computing device 900 may be used as a server, desktop computer, portable computer, smart phone, special purpose computer, or similar device. In an example basic configuration 902, the computing device 900 may include one or more processors 904 and a system memory 906. A memory bus 908 may be used for communicating between the processor 904 and the system memory 906. The basic configuration 902 is illustrated in FIG. 9 by those components within the inner dashed line.

Depending on the desired configuration, the processor 904 may be of any type, including but not limited to a microprocessor (μP), a microcontroller (μC), a digital signal processor (DSP), or any combination thereof. The processor 904 may include one more levels of caching, such as a level cache memory 912, one or more processor cores 914, and registers 916. The example processor cores 914 may (each) include an arithmetic logic unit (ALU), a floating point unit (FPU), a digital signal processing core (DSP Core), or any combination thereof. An example memory controller 918 may also be used with the processor 904, or in some implementations the memory controller 918 may be an internal part of the processor 904.

Depending on the desired configuration, the system memory 906 may be of any type including but not limited to volatile memory (such as RAM), non-volatile memory (such as ROM, flash memory, etc.) or any combination thereof. The system memory 906 may include an operating system 920, a media application 922, and program data 924. The media application 922 may include a media engine 826 to determine if received media is according to a format that includes metadata indicating gap information. If metadata indicating gap information is detected that information may be extracted and used to create a media stream with gap(s) removed. If the received media does not include metadata indicating gap information, heuristics may be employed to estimate and remove gap(s) in the resulting media stream. The media stream may then be saved or played. The program data 924 may include, among other data, samples 928 that may be used to generate gapless media, as described herein.

The computing device 900 may have additional features or functionality, and additional interfaces to facilitate communications between the basic configuration 902 and any desired devices and interfaces. For example, a bus/interface controller 930 may be used to facilitate communications between the basic configuration 902 and one or more data storage devices 932 via a storage interface bus 934. The data storage devices 932 may be one or more removable storage devices 936, one or more non-removable storage devices 938, or a combination thereof. Examples of the removable storage and the non-removable storage devices include magnetic disk devices such as flexible disk drives and hard-disk drives (HDDs), optical disk drives such as compact disk (CD) drives or digital versatile disk (DVD) drives, solid state drives (SSDs), and tape drives to name a few. Example computer storage media may include volatile and nonvolatile, removable and non-removable media implemented in any method or technology for storage of information, such as computer readable instructions, data structures, program modules, or other data.

The system memory 906, the removable storage devices 936 and the non-removable storage devices 938 are examples of computer storage media. Computer storage media includes, but is not limited to, RAM, ROM, EEPROM, flash memory or other memory technology, CD-ROM, digital versatile disks (DVDs), solid state drives, or other optical storage, magnetic cassettes, magnetic tape, magnetic disk storage or other magnetic storage devices, or any other medium which may be used to store the desired information and which may be accessed by the computing device 900. Any such computer storage media may be part of the computing device 900.

The computing device 900 may also include an interface bus 940 for facilitating communication from various interface devices (for example, one or more output devices 942, one or more peripheral interfaces 944, and one or more communication devices 946) to the basic configuration 902 via the bus/interface controller 930. Some of the example output devices 942 include a graphics processing unit 948 and an audio processing unit 950, which may be configured to communicate to various external devices such as a display or speakers via one or more A/V ports 952. One or more example peripheral interfaces 944 may include a serial interface controller 954 or a parallel interface controller 956, which may be configured to communicate with external devices such as input devices (keyboard, mouse, pen, voice input device, touch input device, etc.) or other peripheral devices (printer, scanner, etc.) via one or more I/O ports 958. An example communication device 946 includes a network controller 960, which may be arranged to facilitate communications with one or more other computing devices 962 over a network communication link via one or more communication ports 964. The one or more other computing devices 962 may include servers, computing devices, and comparable devices.

Although not depicted explicitly by FIG. 9, one or more cameras may be included in computing device 900. The cameras may communicate with the processor 904 via the peripheral interfaces 944 and interface bus 940. The computing device 900 may thereby receive images from the cameras and store image data in the system memory 906.

The computing device 900 may also be implemented as a part of a general purpose or specialized server, mainframe, or similar computer that includes any of the above functions. The computing device 900 may also be implemented as a personal computer, including both laptop computer and non-laptop computer configurations, as a tablet computer, smartphone, digital camera, and so on.

Each of the processes, methods and algorithms described in the preceding sections may be embodied in, and fully or partially automated by, code modules executed by one or more computers or computer processors. The code modules may be stored on any type of non-transitory computer-readable medium or computer storage device, such as hard drives, solid state memory, optical disc and/or the like. The processes and algorithms may be implemented partially or wholly in application-specific circuitry. The results of the disclosed processes and process steps may be stored, persistently or otherwise, in any type of non-transitory computer-readable storage such as volatile or non-volatile storage. The various features and processes described above may be used independently of one another, or may be combined in various ways. All possible combinations and subcombinations are intended to fall within the scope of this disclosure. In addition, certain methods or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel or in some other manner. Blocks or states may be added to or removed from the disclosed example embodiments. The example systems and components described herein may be configured differently than described. For example, elements may be added to, removed from or rearranged compared to the disclosed example embodiments.

It will also be appreciated that various items are illustrated as being stored in memory or on storage while being used, and that these items or portions thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network or a portable media article to be read by an appropriate drive or via an appropriate connection. For purposes of this specification and the claims, the phrase "computer-readable storage medium" and variations thereof, does not include waves, signals, and/or other transitory and/or intangible communication media. The systems, modules and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present disclosure may be practiced with other computer system configurations.

Conditional language used herein, such as, among others, "can," "could," "might," "may," "e.g." and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having" and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some or all of the elements in the list.

While certain example embodiments have been described, these embodiments have been presented by way of example only and are not intended to limit the scope of the inventions disclosed herein. Thus, nothing in the foregoing description is intended to imply that any particular feature, characteristic, step, module or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed:

1. An apparatus, comprising:
a first camera configured to obtain first image data of a first resolution;
operatively coupled to the first camera, an image processing system including a resolution-expanding neural network configured to
scale the first image data to a resolution greater than the first resolution, wherein the neural network is trained by using the neural network to scale, to the first resolution, second image data acquired by a second camera at a second resolution lower than the first resolution, with comparison of the first image data versus the second image data scaled to the first resolution and subsequent refinement of neural-network parameters.

2. The apparatus of claim 1, wherein the first image data and the second image data are each scaled by an equivalent scaling factor.

3. The apparatus of claim 1, wherein the first camera has a maximum resolution greater than a maximum resolution of the second camera.

4. The apparatus of claim 1, wherein the image-processing system is configured to:
apply the neural network to the second image data;
calculate an error value based on a comparison of the scaled second image data to the first image data; and
train the neural network based on the error value.

5. The apparatus of claim 1, wherein the neural-network parameters include a plurality of weights associated with the neural network.

6. The apparatus of claim 1,
wherein the first image data and the second image data are acquired contemporaneously.

7. The apparatus of claim 1, wherein the first image data and the second image data correspond to a common region of an image frame acquired by each of the first and second cameras contemporaneously.

8. A method comprising:
receiving first image data from a first camera at a first resolution; and scaling the first image data to a resolution higher than the first resolution by application of a non-linear function to the first image data, wherein one or more coefficients of the non-linear function are selected by using the non-linear function to scale, to the first resolution, second image data of a second resolution lower than the first resolution, by comparison of the first image data versus the second image data scaled to the first resolution and subsequent refinement of the one or more coefficients.

9. The method of claim 8, wherein each of the first image data and the second image data is scaled by a common scaling factor.

10. The method of claim 8, further comprising:
receiving the second image data from a second camera, wherein the second camera has a maximum resolution less than a maximum resolution of the first camera.

11. The method of claim 8, further comprising:
scaling the second image data by applying the non-linear function to the second image data, unsealed from the second camera.

12. The method of claim 8, wherein the non-linear function is a first non-linear function, the method further comprising:
scaling the second image data by applying a second non-linear function trained independently of the first non-linear function.

13. The method of claim 8, wherein the second image data is obtained from a second camera.

14. The method of claim 13, wherein the second image data is obtained from the first camera.

15. An apparatus, comprising:
a first camera;
a second camera;
at least one processor; and
computer memory having stored thereon instructions that, when executed by the at least one processor, cause the apparatus to:
obtain first image data from the first camera, the first image data having a first resolution;
obtain second image data from the second camera, the second image data having a second resolution, lower than the first resolution;
use a resolution-expanding neural network to scale the second image data to the first resolution;
train the resolution-expanding neural network based on a comparison of the first image data versus the second image data scaled to the first resolution; and
use the trained resolution-expanding neural network to scale the first image data to a resolution higher than the first resolution.

16. The apparatus of claim 15, wherein the first image data and the second image data are each scaled by a common scaling factor.

17. The apparatus of claim 15, wherein the first camera has a maximum resolution greater than the maximum resolution of the second camera.

18. The apparatus of claim 15, wherein the first image data and the second image data are acquired contemporaneously.

19. The apparatus of claim 15, wherein the first image data and the second image data correspond to a common region of an image frame acquired by each of the first and second cameras contemporaneously.

\* \* \* \* \*